(12) United States Patent
Ribaud et al.

(10) Patent No.: US 7,610,762 B2
(45) Date of Patent: Nov. 3, 2009

(54) HIGH EFFICIENCY THERMAL ENGINE

(75) Inventors: Yves Ribaud, Bonnelles (FR); Joel Guidez, Paris (FR); Jean-Paul Breteau, Ivry sur Seine (FR); Thierry Courvoisier, Le Perray en Yvelines (FR); Olivier Dessornes, Villebon sur Yvette (FR); Clement Dumand, Palaiseau (FR)

(73) Assignee: ONERA, Chatillon Cedex (FR)

( * ) Notice: Subject to any disclaimer, the term of this patent is extended or adjusted under 35 U.S.C. 154(b) by 478 days.

(21) Appl. No.: 11/557,738

(22) Filed: Nov. 8, 2006

(65) Prior Publication Data

US 2008/0000238 A1   Jan. 3, 2008

(51) Int. Cl.
*F02C 3/04* (2006.01)
(52) U.S. Cl. .......................... 60/792; 60/39.17; 60/804
(58) Field of Classification Search ................ 60/39.17, 60/39.183, 39.45, 39.58, 784, 789, 791, 792, 60/804, 805
See application file for complete search history.

(56) References Cited

U.S. PATENT DOCUMENTS

| 2,399,394 | A | | 4/1946 | Seippel |
| 2,461,186 | A | | 2/1949 | Seippel |
| 2,469,238 | A | * | 5/1949 | Newton ........................ 60/792 |
| 2,625,012 | A | * | 1/1953 | Larrecq ........................ 60/792 |
| 2,704,434 | A | * | 3/1955 | Schmitt ........................ 60/761 |
| 3,879,937 | A | | 4/1975 | Jenny |
| 4,288,203 | A | | 9/1981 | Fried et al. |
| 4,971,524 | A | | 11/1990 | Bloemhof |
| 5,052,895 | A | | 10/1991 | Althaus |
| 5,522,217 | A | | 6/1996 | Zauner |
| 5,894,719 | A | | 4/1999 | Nalim et al. |
| 5,932,940 | A | | 8/1999 | Epstein et al. |
| 6,392,313 | B1 | | 5/2002 | Epstein et al. |

FOREIGN PATENT DOCUMENTS

| CH | 225426 | 1/1943 |
| CH | 229280 | 10/1943 |
| DE | 485386 | 11/1929 |

OTHER PUBLICATIONS

Yves Ribaud & Veronique Quintilla, Nouevelle Revue D' Aeronautique et D'Astronatuique, No. 5, 1998.
"Numerical Simulation of Unsteady Flow Processes in Wave Rotors", in the Proceedings of IMECE04, 2004 ASME International Mechanical Engineering Congress, Nov. 13-19, 2004 Anaheim, California USA (IMECE2004-60973).

* cited by examiner

*Primary Examiner*—Louis J Casaregola
(74) *Attorney, Agent, or Firm*—Frost Brown Todd LLC

(57) ABSTRACT

The engine comprises a low pressure stage (1) and a high pressure stage (2) with two independent rotors (3,4) and associated fixed fluid preparation members (9,10,13,14), combining "compressor" means (15,16) and "expander" means (17, 18) and at least one combustion chamber (19,20) in a central volume defined axially by the rotors (3,4) and laterally by three substantially cylindrical, coaxial walls (22,23,24), defining in pairs an outer duct (25) connecting the outlet of the LP compressor (15) to the inlet of the HP compressor (16) and an inner duct (26) connecting the outlet of the HP compressor (16) to the inlet of a first combustion chamber (19), whose outlet supplies the HP expander (18) with gases produced by combustion guided to the inlet of the LP expander (17), whose outlet is in communication with the outside via at least one exhaust opening (41) for the combustion gases.

24 Claims, 3 Drawing Sheets

Figure 1:
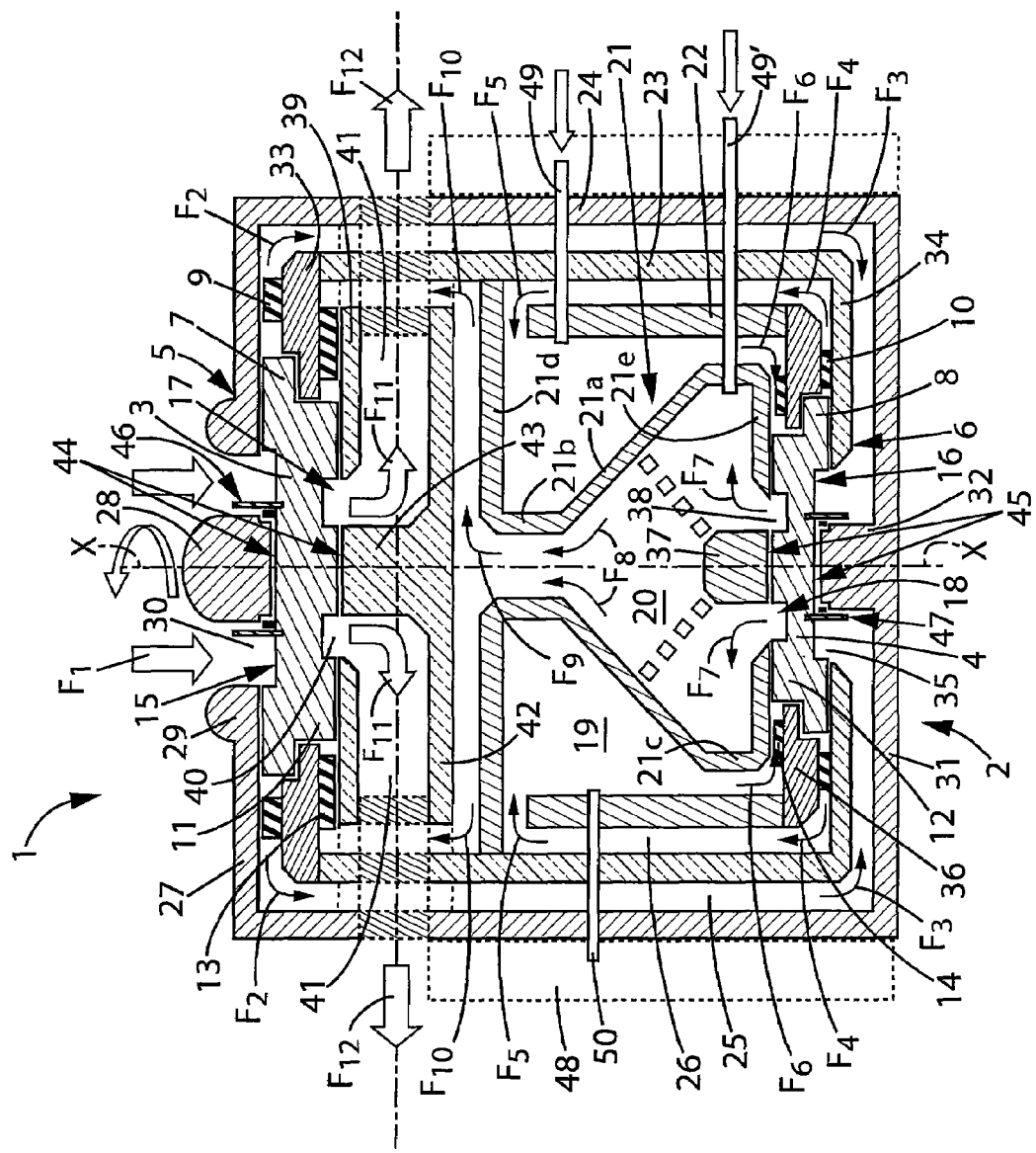

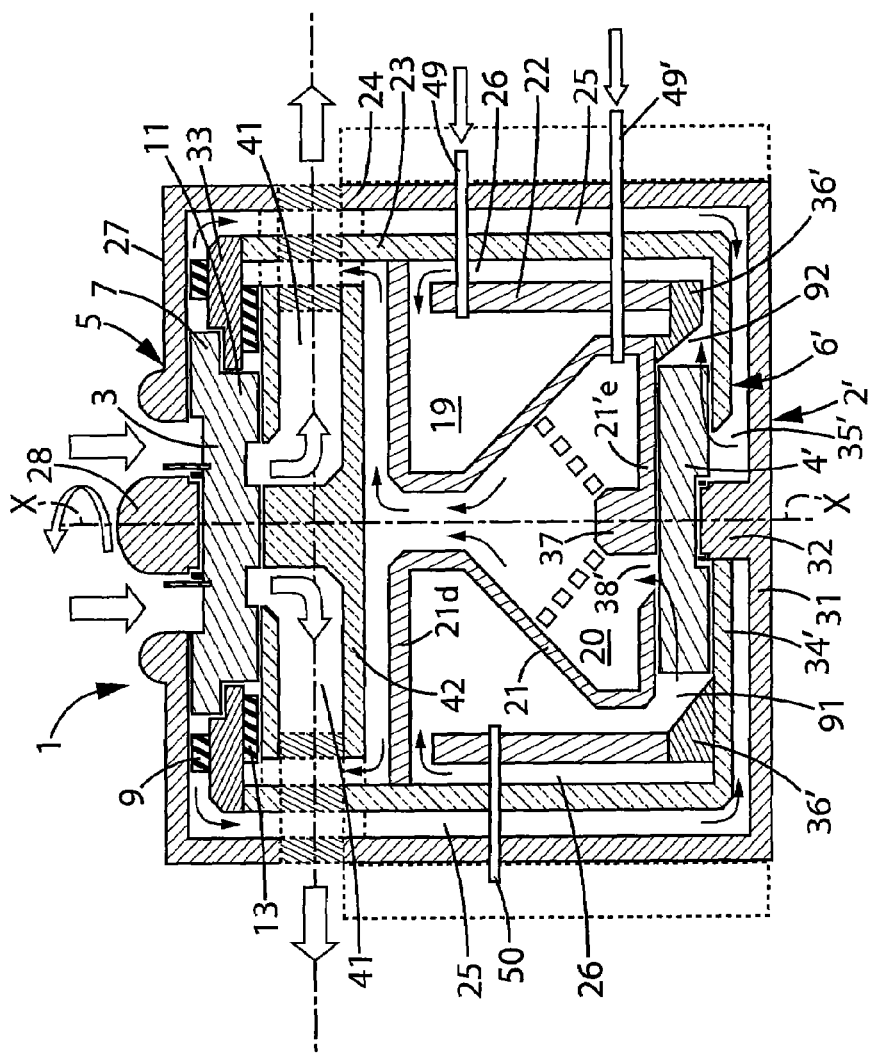
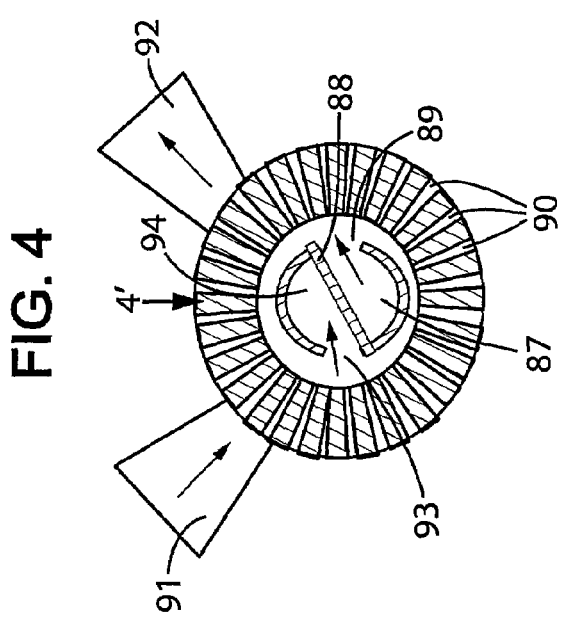
FIG. 3
FIG. 4

HIGH EFFICIENCY THERMAL ENGINE

The present invention relates to a high efficiency thermal engine, of the general turbine engine type, whose power falls within the range from 10 watts to approximately 1 kW, that is to say up to the upper limit for the field of ultra micro turbine engines.

Such ultra micro turbine engines are known in particular from U.S. Pat. Nos. 5,932,940 and 6,392,313, to which reference will advantageously be made for any further details relating to such engines. These patents relate to various embodiments of turbomachinery, such as in particular gas turbines, turbocompressors, turbogenerators, turbopumps, turboreactors, and various combinations of these latter configurations, whose constituent parts are made from one and the same material, preferably SiC, the various constituent components or parts being obtainable by methods for manufacturing electromechanical Microsystems, known as MEMS ("Micro Electro Mechanical System"), and in particular bidimensional machining.

The main applications envisaged for such thermal microengines, of the micro gas turbine type, are microdrone propulsion, the autonomous or individual supply, known as "onboard", of mechanical, pneumatic or electrical energy for robots, portable systems, microsatellites, actuators, and for cooling electronic circuits, this list not being exhaustive.

It has in fact recently become clear that thermal microengines could supplant batteries in terms of specific power and specific energy, on condition that their thermal yield is sufficient, the various thermal microengine designs proposed having in common the fact that their energy is drawn from micro combustion or an exothermic chemical reaction. In effect, use of the combustion process for the generation of electrical power has enormous advantages relative to conventional batteries, in terms of energy storage per unit mass, as well as in terms of power generation per unit volume. Of the various types of thermal engines proposed, the ultra micro gas turbine is of particular interest due to its great potential in terms of specific power and energy.

The basis of the Microsystems to which the two above-cited US patents relate is a micro gas turbine, of which two versions are proposed, one with a small diameter rotor (4 mm) and two discs connected by a shaft, and the other with twice the diameter and comprising two attached discs.

The main components of the microturbine are a combustion chamber, and a centrifugal compressor and a centripetal turbine which, in the first version, are mounted on one and the same hollow shaft revolving at a circumferential speed of the order of 500 m/s. An electric generator/motor, situated above the rotor of the compressor, has the task of producing electrical energy during operation, as well as of driving the shaft common to the compressor and to the turbine during start-up of the microturbine. Fuel is injected downstream of a bladed diffuser, radially surrounding the compressor wheel, and is premixed with the stream of compressed air leaving the diffuser in a centrifugal premixing channel, before entering the combustion chamber, whence the combustion gases exit via a centripetal channel opening onto the rotor of the turbine, through a bladed distributor radially surrounding the latter. The rotor shaft is guided by gas bearings because of the high speed of rotation.

In one example of embodiment, these various members are made of refractory ceramics, starting by stacking and aligning six layers of SiC, each of these layers being obtained by a known ion microetching method, SiC being used rather than Si because of its ability to withstand the stresses imposed by the high speed of rotation and the high temperature of the cycle selected for the micro gas turbine, which may be a Brayton cycle or a conventional gas turbine cycle.

In the second microturbine version proposed in the two above-cited US patents, the diameter of the microturbine is doubled (21 mm), the compressor and turbine discs are attached by their opposing faces to the corresponding compressor or turbine blading, which constitutes a favourable arrangement from the point of view of reducing aerodynamic losses by disc friction, and seems to reinforce the mechanical solidity of the rotor by reducing its axial bulk, the diameter of the disc on the turbine side has been substantially reduced and its thickness increased, and finally the compressor inlet and the turbine exhaust surround a central body, allowing the provision at this location of a thrust bearing in the form of a gas thrust bearing.

Overall energy studies, described in the article by Y. Ribaud "Overall thermodynamic study of an ultra micro turbine, Journal of Thermal Science Vol. 13, No. 4, November 2004", relating to this type of turbine engine, taking account of the intense internal thermal transfers taking place in such turbine engines and resulting in a thermal mixture causing deterioration in energy performance, show that the design and architecture thereof are not favourable from an aerothermodynamic standpoint.

In effect, the combustion chamber of these turbine engines is annular, flattened axially and wrapped substantially around the rotor of the turbine engine, resulting in a large transverse section and a large contact surface with the working gases, and consequently in considerable thermal leaks bringing with them the risk of incomplete combustion and ignition difficulties in the combustion chamber. Furthermore, the compressor and the turbine also behave as exchangers, in particular in the second version, in which the compressor and turbine discs are attached, which is very unfavourable from the point of view of thermal transfers, such that reheating in the compressor is prejudicial to the compression ratio, and consequently diminishes the useful power, and simultaneously cooling of the turbine also reduces the drop in available enthalpy, and thus the useful power. This very harmful thermal mixture is all the more significant because a single, highly conductive material, to be specific monocrystalline silicon carbide, is used to produce these turbine engine components. Furthermore, machining of the monocrystalline silicon carbide is very difficult, so making the cost price prohibitive at an industrial level. Moreover, the magnetic-type electric generator associated with this type of turbine engine is handicapped by the high temperatures to which it is subjected, which may cause demagnetization when the Curie point is reached.

On the basis of this second microturbine version, a derivative version was recently proposed, in an article entitled "Micro Combustion Principles Dedicated To Micro-Turbines" by O. DESSONES, C. DUMAND, D. GAFFIE, J. GUIDEZ and Y. RIBAUD, published in POWERMEMS 2003, MAKUHARI, JAPAN, in which the combustion chamber is no longer wrapped around the rotor, but offset axially relative to the rotor in the form of a separate chamber located "within the volume", and not "at the surface", and capable of being produced separately, by moulding or laser micromachining for example, in a hybrid microturbine structure.

Such a hybrid structure has the advantages of possible adaptation of the volume of the combustion chamber to the type of fuel used, with reduction of the transverse section, of a reduction in the surface area exchanging heat with the outside, of possible use of insulating materials on certain parts in order to improve substantially the thermal yield, and of a centripetal turbine exhaust which may be radial, this being more favourable from an energy standpoint than the axial exhaust in the above-cited US patents.

However, this derivative version remedies only incompletely the above-mentioned drawbacks of the microturbines according to the two above-cited US patents.

The problem on which the invention is based is to propose a thermal micro turbine engine architecture which remedies the above-mentioned major drawbacks of the micro turbine engines according to the above-cited US patents and which is better suited to the various practical demands than the micro turbine engines of the prior art, in particular in that the somewhat general architecture proposed may be applied to higher power thermal engines, of the order of 10 to 300 kW, thus making available autonomous, "onboard", energy in mechanical, pneumatic or electrical form, the proposed architecture preferably also freeing the manufacturers from the need to use just one highly conductive material which is very difficult to machine, such as SiC, so making possible a choice of a plurality of types of material (Si, ceramics, metal alloys), which may be conductive or insulating depending on the functions fulfilled by the various components made of these different materials.

To this end, the invention proposes a thermal engine comprising:

two independent rotors, preferably coaxial, each respectively mounted in one of two casings, the first rotor belonging to a low pressure stage, the second rotor belonging to a high pressure stage, each stage provided with its rotor and associated fixed fluid preparation members combining gas compression means, known as compressors, and gas expansion means, known as expanders and at least one combustion chamber situated within a substantially cylindrical central volume defined at its bases by the two rotors and their casings, and at its lateral surface by a first substantially cylindrical wall, in an inner radial position, said first wall being substantially coaxial with a second substantially cylindrical wall in an intermediate radial position, these defining between them a first duct connecting the outlet of the compressor of the high pressure stage to the inlet of a first combustion chamber and said second wall being substantially coaxial with a third substantially cylindrical wall in an outer radial position, these defining between them a second duct, outside the first duct and connecting the outlet of the compressor of the low pressure stage to the inlet of the compressor of the high pressure stage, the outlet of the first combustion chamber supplying the expander of the high pressure stage with gases produced by combustion, guided from the outlet of the expander of the high pressure stage to the inlet of the expander of the low pressure stage, the outlet of which is in communication with the outside of a casing of the engine via at least one exhaust opening for the gases produced by combustion.

The advantages of such an architecture are numerous: owing to mounting the combustion chamber(s) in a substantially cylindrical central volume of the engine, defined between the two rotors and their casings, in a substantially axial direction, and, radially, inside three substantially coaxial and cylindrical walls defining between them, radially from the inside outwards, a duct conveying gas, such as high pressure compressed air, between the outlet of the high pressure stage compressor and the inlet of a first combustion chamber, and a duct conveying said gas, such as low pressure compressed air, between the outlet of the low pressure stage compressor and the inlet of the high pressure stage compressor, a turbine engine architecture is produced which is arranged as a "thermodynamic cocoon", in which the hot parts are concentrated in the central volume of the engine, or facing the inside of the engine, and may be at least partially thermally insulated from the cold peripheral parts by selecting thermally insulating materials for producing at least one intermediate wall or casing between inner walls or casings, on the one hand, and outer walls or casings, on the other hand, made of thermally conductive materials. Furthermore, the circumferential speed of each rotor may be reduced due to the adoption of a two-stage architecture, such that the mechanical stresses are alleviated, and, moreover, it is easier to develop gas bearings at these lower speeds than at the speeds in the single-stage embodiments of the prior art. Moreover, the increase in the compression ratio, resulting from the two-stage architecture, is highly advantageous from an energy standpoint.

More precisely and advantageously, the outer casing of the engine, which comprises the third wall defining radially towards the outside the second, annular, outer duct for the flow of low pressure compressed gas, is made of thermally conductive material and, preferably, is provided with fins and/or spikes on its outer and/or inner face, whilst the first, annular, inner duct for the flow of high pressure compressed gas is defined between the second wall, arranged as an intermediate casing of a thermally insulating material, radially towards the outside and separating it from the second duct, and the first wall arranged as an inner casing of a thermally conductive material, radially towards the inside and separating it from the first combustion chamber. These technical features improve the containment of the hot parts (combustion chamber(s) and the two expanders) of the turbine engine in its central part, and the retention, at the periphery of the engine, of "cold" parts (the least hot, in particular the two compressors), which facilitates control of their temperatures and of thermal flows, owing to the mutually inverted mounting of the two rotors and to the arrangement of at least one combustion chamber in the central part of the engine, between the two expanders disposed facing one another, whilst the two compressors face the outside of the engine.

For the same reasons, exhaust towards the outside of the gases stemming from the expander of the low pressure stage is advantageously ensured by discrete ducts extending substantially radially towards the outside relative to the axis of the first rotor.

In a preferred embodiment, the thermal engine according to the invention comprises two combustion chambers accommodated in the central volume between the two rotors, of which the first combustion chamber, known as the main combustion chamber, supplied with high pressure compressed gas, such as air, exiting from the compressor of the high pressure stage via the first duct, converges substantially in the direction of the axis of the second rotor towards the inlet of the expander of the high pressure stage, whose outlet leads into the inlet of the second combustion chamber, known as the secondary combustion chamber, surrounded by the first annular combustion chamber and which converges axially towards its outlet connected radially towards the outside to the inlet of the expander of the low pressure stage, flow of the gases in the two combustion chambers taking place substantially axially in opposing directions.

A very high efficiency thermal engine is thus produced, with two combustion chambers, one of which surrounds the other and both being situated between the expanders of the two rotors and their casings and inside the three substantially coaxial and cylindrical walls, of which the intermediate wall is advantageously thermally insulating, the gases produced by combustion passing in countercurrent through the two combustion chambers, which improves still further the temperature control thereof. To this end, the two combustion chambers are advantageously separated from one another by a substantially conical central partition of a thermally conductive material shaped so as to define the countercurrent convergent paths of the two combustion chambers.

Also with the aim of improving the thermal equilibrium of the engine according to the invention, ducts exhausting towards the outside the exhaust gases stemming from the expander of the low pressure stage are advantageously defined between two substantially radial, thermally insulating inner walls, one of which surrounds the outlet of the expander of the low pressure stage while the second diverts radially towards the outside the gases produced by combustion stemming from said at least one combustion chamber and from the expander of the high pressure stage.

Furthermore, in the "thermodynamic cocoon" architecture of the thermal engine according to the invention, said thermal engine is advantageously such that the ratio of its substantially radial and axial dimensions relative to the axis of one at least of the rotors is around 1.

In a preferred embodiment, the low pressure stage comprises the first rotor, which comprises, on a face facing the outside of the engine, a bladed wheel of a centrifugal compressor, which rotates radially inside an annular diffuser with blades which are fixed relative to the casing of the first rotor, and, on the inner face of the rotor, a bladed wheel of a centripetal turbine, which rotates radially inside an annular centripetal distributor with blades which are fixed relative to the casing of the first rotor, the wheels of the compressor and turbine being connected for rotation around their common axis, which is the axis of the first rotor.

In this case, and according to a first variant embodiment, the high pressure stage has an architecture similar to that of the low pressure stage, the two stages being inverted relative to one another, the high pressure stage comprising the second rotor, which comprises, on a face facing the outside of the engine, a bladed wheel of a centrifugal compressor, which rotates radially inside an annular diffuser with blades fixed relative to the casing of the second rotor, and, on the inner face of the rotor, a bladed wheel of a centripetal turbine, which rotates radially inside an annular centripetal distributor with blades fixed relative to the casing of the second rotor, the wheels of the compressor and turbine being connected for rotation around their common axis, which is the axis of the second rotor.

In this way, a turbine engine is produced with a low pressure turbocompressor stage and a high pressure turbocompressor stage, between which the combustion of a mixture of a high pressure compressed gas, such as air, and a hydrocarbon-based fuel is ensured in one or two central combustion chambers, in a both radially and axially staged arrangement which greatly facilitates production of the various components of the thermal engine in suitable materials and involves the implementation of more conventional and more economic manufacturing and in particular machining methods than the manufacturing methods used for MEMS technologies.

However, according to a second variant, the high pressure stage comprises a wave compressor-expander, known as a "wave rotor", in which a transfer of energy between compression of a gas such as air and expansion of combusted gases takes place inside a wheel with channels by direct contact between said gas (air) and said gases, such as air, and combusted gases in said channels and by a process based on the displacement of expansion waves and compression waves in said channels of said channelled wheel, said "wave rotor" comprising an inlet for admission gas (air), an outlet for compressed gas (air), connected to a first combustion chamber, an admission inlet for the combusted gases stemming from the outlet of the first combustion chamber, and an exhaust outlet for said combusted gases, towards a second combustion chamber, if applicable, and the expander of the low pressure stage.

Such wave compressor-expanders, or wave rotors, also known as "pressure exchangers", are devices of which examples of embodiment are described in the old patents DE 485,386 and CH 225,426 and 229,280, to which U.S. Pat. Nos. 2,399,394 and 2,461,186 correspond, these devices having been the subject of numerous developments described in numerous more recent patents.

As in the prior art, the rotors of the thermal engine according to the invention are advantageously supported axially and radially by gas bearings.

The thermal engine according to the invention and as defined so far in the description may constitute the heart of a more complex system combining, for example, a micro gas turbine, of the combined-cycle type with a turbogenerator and a starter, which may use a solid propellant and/or be electrical, with a heating resistor.

In this case, the casing of the engine defining, radially or externally, the second duct may be at least partially immersed in a preferably double-walled, impermeable, closed water tank, intended to produce pressurized steam and to insulate the thermal engine thermally from the outside and facilitate its integration in a receptacle designed therefor.

Advantageously, in this combined-cycle thermal engine, the steam produced in a first chamber of the tank has its pressure controlled by a valve communicating with a second tank chamber, itself in communication with the inlet of the expander of the low pressure stage, so as to mix steam with the gases produced by combustion stemming from said at least one combustion chamber, before passage thereof into the expander of the low pressure stage.

In this combined-cycle thermal engine, the gases and steam stemming from the expander of the low pressure stage are exhausted via separate ducts, preferably extending substantially radially, and continuing through the water tank before emerging into the surrounding environment, so as to ensure preheating of the water in the tank.

Furthermore, whether or not this thermal engine is a combined-cycle engine, the stream of gas (air) stemming from the compressor of the low pressure stage may be divided into two flows, one of which is directed towards the compressor of the high pressure stage and the other towards utilization, in pneumatic form, of the useful power.

In this case, to obtain a thermal turbine engine associated with a turbogenerator, the flow of low pressure compressed gas (air), corresponding to the useful power transmitted by the compressor of the low pressure stage, supplies a turbine of a turbogenerator, whose electric generator supplies a battery, connected by at least one electrical power outlet to at least one electrical consumer unit.

In this case, advantageously, the electric turbogenerator is thermally insulated from the engine casing enclosing the two rotors, said at least one combustion chamber and the ducts for the flow of low pressure and high pressure gas (air) and low pressure and high pressure gases produced by combustion.

In a preferred example of embodiment, the electric generator of the turbogenerator is of magnetic type, comprising at least one permanent magnet mounted on one face of a bladed wheel of a centripetal turbine of the turbogenerator, on the opposite side to the face having the blades of said centripetal turbine, said at least one permanent magnet being connected for rotation to the centripetal turbine wheel of the turbogenerator and revolving opposite at least one flat armature coil of the electric generator.

To ensure operation and start of the turbine engine, and according to a first embodiment, the battery supplied by the electric generator of the turbogenerator itself supplies at least one electrical ignition device for the gas (air)/fuel mixture in said at least one combustion chamber, into which fuel is injected via at least one fuel supply duct.

Where the outer casing of the thermal engine is at least partially immersed in an impermeable, closed water tank, the battery supplied by the electric generator of the turbogenerator may itself supply at least one heating resistor disposed in a chamber of the water tank, to produce pressurized steam supplying the expander of the low pressure stage so as to start the thermal engine with electrical starter with heating resistor.

In a variant, the flow of low pressure compressed gas (air) stemming from the compressor of the low pressure stage supplies the centripetal turbine of the turbogenerator after opening of a check valve, and preferably through an annular centripetal distributor with fixed blades surrounding the bladed wheel of said centripetal turbine of the turbogenerator, or through a volute surrounding said centripetal turbine of the turbogenerator.

When the thermal engine according to the invention is equipped with a solid propellant starter, the starter is arranged as a gas generator by ignition, preferably electrical, by means of a battery, of the solid propellant, such that a gas flow resulting from combustion of the solid propellant is directed, via at least one inlet in a radial end face of the engine casing, preferably around an admission gas (air) inlet opening in the thermal engine, so as to bring about rotation of the rotor of the low pressure stage.

In this case, advantageously, the starter arranged as a gas generator receives a solid propellant cartridge provided for each start of the thermal engine, said gas generator being connected to the inside of the casing of the thermal engine via at least one quasi-tangential inlet so as to set the rotor of the low pressure stage in rotation.

Figure 2:
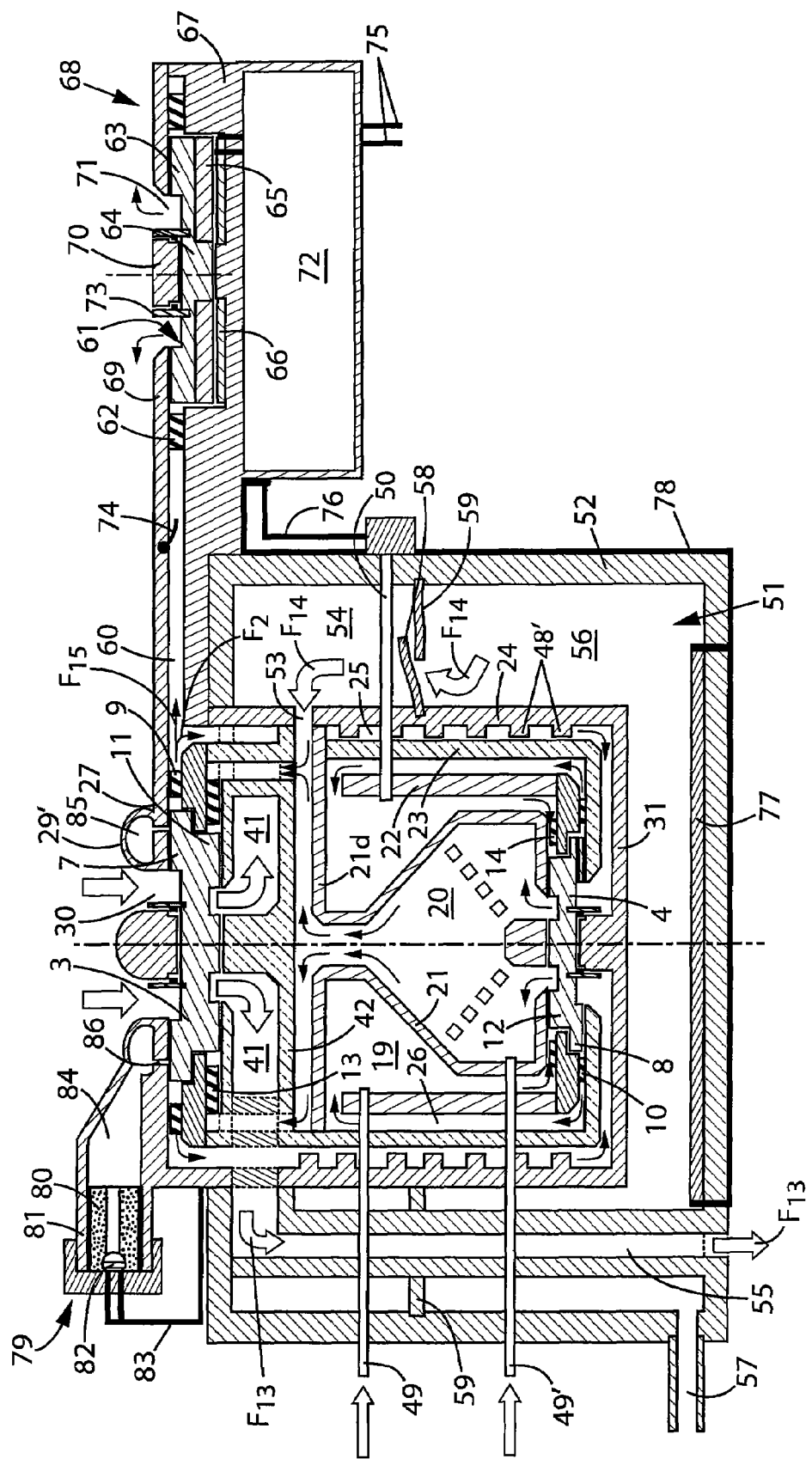

Other features and advantages of the invention will be revealed by the description given below, in non-limiting manner, of examples of embodiment described with reference to the appended drawings in which:

FIG. 1 is a schematic view in axial section of a micro gas turbine according to the invention, FIG. 2 is a schematic view in axial section of a thermal engine, the heart of which consists of a micro gas turbine similar to that of FIG. 1, installed in a water tank and operating in a combined cycle involving gases produced by combustion and steam, equipped with an electrical and/or solid propellant starter, and associated with a turbogenerator, FIG. 3 is a view similar to FIG. 1 of a variant embodiment of the micro gas turbine, of which the high pressure stage consists of a wave compressor-expander or wave rotor, and FIG. 4 is a schematic view in cross-section of the radial wave rotor which may be used as a high pressure stage in the microturbine variant of FIG. 3.

The thermal engine shown in FIG. 1 is a micro gas turbine of the "within the volume" or "thermodynamic cocoon" type, which comprises two stages 1 and 2, of the same general configuration, i.e. a low pressure (LP) stage 1 and a high pressure (HP) stage 2 situated at the level of the two bases of a cylindrical volume occupied by the microturbine.

Each stage 1 or 2 comprises a rotor 3 or 4 respectively, mounted to rotate about its axis independently of the other rotor.

In this example, the two rotors, LP 3 and HP 4, are coaxial around the axis XX, but the axes of the two rotors may be laterally offset relative to one another and/or inclined slightly relative to one another in variant embodiments.

Each rotor 3 or 4 is mounted rotatingly in a respective casing, LP 5 or HP 6, of which the structure is specified below.

Each rotor 3 or 4 comprises, on a face facing the opposite way from the other rotor 4 or 3, that is to say on its face facing the outside of the engine, a bladed centrifugal compressor wheel, LP 7 or HP 8, which rotates radially inside a respective annular centrifugal diffuser 9 or 10 with blades fixed on the corresponding casing 5 or 6.

On its opposing face, facing the other rotor or towards the inside of the engine, or inner face, each rotor 3 or 4 comprises a respective bladed centripetal turbine wheel, LP 11 or HP 12, which rotates radially inside a respective centripetal annular distributor 13 or 14, with blades fixed on the corresponding casing 5 or 6, such that the two stages 1 and 2 and the two rotors 3 and 4 are mutually inverted.

Each stage LP 1 or HP 2 thus comprises gas compression means, which comprise a centrifugal compressor LP 15 or HP 16, associated with gas expansion means, which comprise a corresponding centripetal turbine LP 17 or HP 18, whose bladed wheels 7 and 11 or 8 and 12 are in one piece with the corresponding rotor LP 3 or HP 4 and thus connected for rotation about their common axis XX, each stage LP 1 or HP 2 linking its rotor LP 3 or HP 4 with fixed fluid preparation members (diffuser 9 or 10 and distributor 13 or 14) in its casing 5 or 6.

Between the stages LP 1 and HP 2, at least one combustion chamber is fitted in the substantially cylindrical central volume of the engine. In this preferred example of embodiment, the central volume reserved for combustion accommodates two combustion chambers coaxial around axis XX, and axially inverted, a first, "main", annular combustion chamber 19 surrounding the other, central, "secondary" combustion chamber 20, separated from the main combustion chamber 19 by a central partition 21 of a thermally conductive material, substantially frustoconical in shape in its axial central part 21$a$, between two cylindrical axial end parts 21$b$ and 21$c$, such that the two combustion chambers 19 and 20 are shaped to converge axially in opposing directions, from their respective inlet towards their respective outlet.

The two combustion chambers 19 and 20 are thermally insulated from the surrounding environment by the two stages LP 1 and HP 2, in an axial direction, and in a radial direction, and from the inside towards the outside, by three substantially cylindrical walls 22, 23 and 24 coaxial around axis XX, of which the $1^{st}$ and $3^{rd}$, namely the inner 22 and outer 24 walls, are each of a thermally conductive material, and the $2^{nd}$, the intermediate wall 23, is of a thermally insulating material.

The outer 24 and intermediate 23 walls define between them an outer annular duct 25 for flow of a gas, in this example LP compressed air, from the outlet, in an outer radial position, of the diffuser 9 of the centrifugal compressor 15 of the LP stage 1 to the axial annular inlet, in an inner radial position, of the centrifugal compressor 16 of the HP stage 2, whilst the intermediate 23 and inner 22 walls define between them an inner annular duct 26 (radially to the inside of the outer duct 25) for flow of the same gas, thus of the HP compressed air, from the outlet of the diffuser 10 of the centrifugal compressor 16 of the HP stage 2 to the annular, radial inlet of the main combustion chamber 19, this inlet being defined between the free end (towards the LP stage 1) of the inner wall 22 and an opposing annular radial wall 21*d*, integral with the end of the cylindrical axial part 21*b* of the central partition 21 and of the same thermally conductive material as this partition 21, the radial wall 21*d* bearing via its periphery against the inside of the intermediate wall 23 while bounding axially the main combustion chamber 19.

To this end, the outer cylindrical wall 24 is integral, at one axial end, with an annular radial wall 27, of the same thermally conductive material as the wall 24 and which constitutes the outer wall of the LP casing 5 and has a central body 28, protruding towards the outside, defining with a peripheral bead 29 likewise protruding towards the outside an axial annular inlet 30 of the LP compressor 15, for the admission gas (air). At its opposite axial end, the outer cylindrical wall 24 is likewise integral with a radial wall 31, in the form of a circular disc, likewise of the same thermally conductive material as the wall 24 and which has a central body 32 protruding towards the inside of the engine, this wall 31 axially closing the HP casing 6 relative to the outside, such that the three outer walls 24, 27 and 31 together constitute the outer casing of the engine.

The intermediate cylindrical wall 23, of a thermally insulating material, is integral, at its axial end on the side of the LP stage 1, with an annular radial flange 33, constituting an axially intermediate part of the LP casing 5 which surrounds the central part of the LP rotor 3 and which supports the fixed blades of the diffuser 9 and of the distributor 13 of the LP stage 1, whilst at its opposite axial end, the wall 23 is integral with an annular radial wall 34, which constitutes the axially outer wall of the HP casing 6 and defines an axial annular inlet 35 of the HP compressor 16, around the central body 32 of the outer axial wall 31 of the outer casing of the engine. Thus, the intermediate wall 23 constitutes with the radial flange 33 and the radial wall 34 a thermally insulating intermediate casing.

The thermally conductive inner cylindrical wall 22, whose axial end facing the LP stage 1 defines, with the opposing thermally conductive radial wall 21*d*, the inlet of the main combustion chamber 19 as described above, is integral via its opposing axial end with an annular radial flange 36, similar to the flange 33 and which thus constitutes an axially intermediate part of the HP casing 6, which surrounds the central part of the HP rotor 4 and supports the fixed blades of the diffuser 10 and of the distributor 14 of the HP stage 2. In this way, the inner wall 22 constitutes, with the flange 36, a thermally conductive inner casing, surrounding the combustion chambers 19 and 20.

The HP casing 6 also comprises, axially towards the inside of the engine, a thermally conductive annular radial wall 21*e*, integral with the axial end of the cylindrical part 21*c* of the central partition 21 separating the combustion chambers 19 and 20 from one another, this annular wall 21*e* defining, around a thermally conductive central body 37 supported by the central partition 21 and in axial extension of the central body 32, the axial annular outlet 38 of the HP turbine 18, which simultaneously constitutes the axial inlet of the secondary combustion chamber 20.

The LP casing 5 is also finished off, axially towards the inside, by an annular radial wall 39, which is thermally insulating and surrounds the axial annular outlet 40 of the LP turbine 17, in communication with the outside of the outer casing 24-27-31 of the engine via exhaust openings provided in the form of discrete ducts 41, extending substantially radially towards the outside relative to the axis XX and defined between the inner radial wall 39 and another, thermally insulating, inner radial wall 42, which, on the one hand, is integral with a thermally insulating inner central body 43, in axial extension of the outer central body 28, and, on the other hand, defines with the radial wall 21*d* a radial duct which diverts radially towards the outside the gases produced by combustion exiting axially from the secondary combustion chamber 20. It should be noted that the radial space between the thermally insulating walls 39 and 42 may be subdivided into radial ducts 41 by ribs integral with the wall 42 and with the central body 43, and that the exhaust ducts 41 are extended by sleeves, not shown but indicated in FIG. 1 by dotted lines, which pass radially through the intermediate and outer casings of the engine, and more precisely the intermediate 23 and outer 24 cylindrical walls, emerging outside the engine.

It should also be noted that the rotors LP 3 and HP 4 are supported axially and radially by gas bearings, such as two gas thrust bearings 44 between the rotor 3 and the central bodies 28 and 43, together with two gas thrust bearings 45 between the rotor 4 and the central bodies 32 and 37, for axial support, and the aerodynamic bearings shown schematically at 46 and 47 for radial support of the rotors 3 and 4 respectively around the central bodies 28 and 32, these different gas bearings being either self-supplied (hydrodynamic bearings) or supplied with compressed air (hydrostatic bearings) taken from the outlet of at least one compressor, preferably the HP compressor 16, and guided as far as these bearings by small channels (non shown) formed in the thicknesses of the walls. These gas bearings 46 and 47 may advantageously, and as is known per se, be plain bearings, foil bearings or pivoted pad thrust bearings, whilst the axial gas thrust bearings 44 and 45 may be of the hydrostatic or hydrodynamic type, preferably with spiral grooves, for their structural simplicity and their efficiency.

The gas circuit in this micro gas turbine, whose overall diameter is approximately 15 mm and whose radial and axial dimension ratio is around 1, is as follows, the admission gas being ambient air.

The outside air is drawn in via the annular inlet 30 (see arrows F1) of the LP centrifugal compressor 15, due to the rotation of the LP compressor wheel 7 of the LP rotor 3, and this admission air passes into this wheel 7 then into the bladed diffuser 9, and after this first compression (arrows F2), the LP compressed air is directed (arrows F3) towards the annular inlet 35 of the HP compressor 16 via the outer LP compressed air duct 25, in which this air may advantageously be cooled if the inner surface and/or the outer surface of the outer cylindrical wall 24 of the engine casing is provided with fins or spikes or similar heat sink members, as shown schematically in broken lines by the fins 48 projecting from the outer face of the outer wall 24. As the intermediate wall 23 defining the LP compressed air duct 25 is thermally insulating, this wall 23 prevents the LP compressed air from being reheated by hot or reheated gases and components inside said wall 23.

Once it has arrived at the inlet 35 of the centrifugal HP compressor 16, the LP compressed air then passes through the corresponding HP compressor wheel 8, then passes into the diffuser 10 and, after this second compression (arrows F4), the HP compressed air is channelled by the inner duct 26 (arrows F5) as far as the inlet of the main combustion chamber 19, in which the HP compressed air is mixed with fuel (hydrocarbon-based fuel or hydrogen) injected into this combustion chamber 19 via one or more fuel supply tubes, such as the radial tube 49, prior to combustion of this mixture under the control of an ignition device 50, of electrical type, which, like the fuel supply tube 49, passes radially through the walls 24, 23 and 22 from the outside of the engine, emerging into the main combustion chamber 19. The fact that the inner casing or the inner wall 22, which separates the inner duct 26 conveying HP compressed air from the main combustion chamber 19, is made of a thermally conductive material has the double advantage of cooling this material while preheating the HP compressed air channelled in the duct 26 before introduction thereof into the main combustion chamber 19 defined by the thermally conductive wall 22 and partition 21. The gases produced by combustion in the chamber 19 are guided via the convergent path around the frustoconical partition part 21a (arrows F6) towards the inlet of the distributor 14 of the HP turbine 18, then pass into the HP centripetal turbine wheel 12 in which they are expanded, and these combusted gases which leave the expander of the HP stage 2 via the annular outlet 38 emerge into the inlet of the secondary combustion chamber 20 (arrows F7) and enter the frustoconical volume defined by the central partition 21a, which converges axially towards the outlet of the secondary chamber 20 (arrows F8), whence the gases produced by combustion are guided (arrows F9) via the radial duct defined between the walls 21d and 42, then axially (arrows F10) inside the intermediate wall 23 as far as the outer radial inlet of the distributor 13 of the LP centripetal turbine 17, of which the wheel 11 and the LP rotor 3 are driven in rotation by the gases produced by combustion which expand and then leave the LP stage 1 via the axial annular outlet 40 of the turbine 17 (arrows F11) and then via the radial exhaust ducts 41 towards the outside of the engine casing (arrows F12).

The presence of the secondary combustion chamber 20, of which the frustoconical volume is defined by the central partition 21, is advantageous, because it makes it possible to reheat the gases produced by combustion stemming from the outlet of the main combustion chamber 19 and which are cooled during their expansion in the HP turbine 18, in order to recover more power in the LP turbine 17. To this end, the secondary combustion chamber 20 is supplied with fuel via one or more supply tubes such as the radial tube 49', similar to the fuel supply tube 49 of the main chamber 19 but emerging in the vicinity of the inlet of the secondary combustion chamber 20 through not only the walls 24, 23 and 22 but also the cylindrical wall 21c, combustion in this secondary chamber 20 of the mixture of the fuel introduced via the tube 49' and the gases leaving the HP turbine 18 being ensured either by self-ignition, as a result of the high temperature of the gases leaving the HP turbine 18, or by means of another ignition device (not shown), similar to the ignition device 50 provided for the main combustion chamber 19 and likewise passing through the walls 24, 23, 22 and 21c such that its end emerges into the secondary combustion chamber 20 at a short distance downstream of the end of the fuel supply tube 49', the flow of the combustion gases in the combustion chambers 19 and 20 thus being in countercurrent, which is combined with the other technical features relating to architecture, structure and choice of materials to achieve an excellent control of the thermal flows in this micro gas turbine, of which the efficiency is consequently elevated. In effect, the structural elements (walls 23, 34, 39, 42, flange 33 in particular) separating the cold parts (compressor wheels 7, 8 and walls 24, 27, 31) from the hot parts (combustion chambers 19, 20, wall 22 and partition 21, and turbine wheels 11, 12) are each of thermally insulating material, whereas, conversely, the structural elements specific to a single part, whether it be cold or hot, are each of at least one thermally conductive material, which promotes the aerodynamic properties of the turbine engine, promoting radiant and/or conduction and/or convection cooling of the outer casing 24-27-31 of the turbine engine and of the two compressor wheels 7, 8, while promoting temperature maintenance in the hot parts in the central volume of the turbine engine.

FIG. 2 shows an embodiment of a micro gas turbine of the "within the volume" or "thermodynamic cocoon" type which is more complete and more effective from an energy standpoint, in an arrangement which is, in principle, reserved for terrestrial applications, for which the main criterion is not the weight of the installation, but the good energy yield level.

In this embodiment, the outer casing 24-27-31 of the microturbine is immersed, over the majority of its axial height, in an impermeable, closed water tank 51 with a thermally insulating, advantageously double-walled outer shell 52, such that only the part of the outer casing which surrounds the casing 5 of the LP stage 1 protrudes above the upper wall of the outer shell 52 of the tank 51. The microturbine partially immersed in the tank 51 is substantially identical to that of FIG. 1, except on three points, one of which is that the inner face of the outer cylindrical wall 24 is provided with heat sink spikes 48' instead of the cooling fins 48 on the outer face of this wall 24 in FIG. 1. Another difference is that the outer bead 29 surrounding the air inlet 30 in the LP stage 1 in FIG. 1 is embodied, in the embodiment of FIG. 2, as a channel 29' for supplying gas to a starter device, described below, for ensuring start of the microturbine. The third notable difference is that a lateral inlet 53 is arranged as a small, substantially radial duct through the outer 24 and intermediate 23 cylindrical walls and the LP compressed air duct 25, so as to bring the interior of an upper annular chamber 54 of the tank 51 into communication with a part of the outer radial periphery of the radial duct defined, in the microturbine, between the radial walls 21d and 42, the parts and components of the microturbine of FIG. 2 which are identical to the corresponding parts and components of the microturbine of FIG. 1 being labelled with the same reference numerals and not being described again.

In the embodiment of FIG. 2, the exhaust gases originating from the LP turbine 17 via the substantially radial ducts 41 of the microturbine are directed towards the surrounding atmosphere (arrows F13) by means of separate ducts 55 passing through the tank 51, and of which only one is shown in FIG. 2, this duct extending vertically so as to pass not only through the upper annular chamber 54 but also through a lower annular chamber 56 of the tank 51, to emerge on the outside at the level of the lower wall of the shell 52 thereof. The water contained in the lower chamber 56 of the tank 51 is heated by the microturbine by contact with its outer casing 24-31 as well as by the exhaust ducts 55, such that this water, admitted into the lower chamber 56 of the tank 51 via a lower lateral water inlet 57, is transformed into pressurized steam. When the pressure of the steam in the lower chamber 56 is at least equal to the pressure of the combusted gases stemming from the secondary combustion chamber 20, a valve 58, mounted in the transverse separating partition 59 between the chambers 54 and 56 of the tank 51, and set to the appropriate pressure, is opened such that the steam fills the upper chamber 54 and penetrates through the lateral opening 53 (arrows F14) into the microturbine, where the steam mixes with the combusted gases stemming from the secondary combustion chamber 20 before entering the LP turbine 17.

This combined thermodynamic cycle embodiment, in which steam is mixed with the gases produced by combustion, has the advantage of reducing the temperature of the gases produced by combustion to a temperature which is more acceptable for the distributor 13 and the LP turbine wheel 11, and also of increasing the flow of gas passing into the LP turbine 17, and therefore of increasing the supplied power. The envelope of water (steam or liquid) which surrounds the microturbine insulates it from the outside, so reducing energy losses and facilitating integration thereof in a receptacle intended therefor, on a consumer unit requiring an onboard energy source.

As a variant, the exhaust ducts such as 55 may be extended towards a condenser (not shown) so as to recover the water contained in the gases ejected from the microturbine.

With regard to the form of useful power supplied by the microturbine, mechanical power may be recovered from a shaft (not shown) linked to the LP rotor 3 bearing the LP turbine wheel 11 or power turbine wheel, revolving at a high rotational speed (several hundred thousand rpm), taking into account the small size thereof in this microturbine.

Nevertheless, the electrical form is the most useful and the best adapted to utilization of the useful energy supplied by the LP turbine 17 or power turbine.

Given the small dimensions, an electric generator of the magnetic type is advantageously used. In effect, electric generators of the electrostatic type require air gaps which are far too small, resulting in much too great a dissipation of energy due to friction of the air against the walls, and therefore, consequently, in significant heating. For these reasons, an electric generator of magnetic type, with an air gap of at least 10 μm, is advantageously used for a useful power of the order of 100 W. In general, at least one permanent magnet is fixed on the rotor (generally a mobile disc) and at least one flat winding is fixed opposite it on a stator. In the case of a microturbine, and as proposed in the above-cited patents U.S. Pat. Nos. 5,932,940 and 6,392,313, a permanent magnet may be placed directly on a disc integral with the blades of the rotor of the LP compressor, the windings being placed opposite it on the casing. However, due to the hot environment, there is a risk that the Curie point will be reached, and therefore there is a risk that the permanent magnet may lose its magnetic properties.

In order to safeguard an electric generator of magnetic type at the elevated temperature levels encountered in the vicinity of the rotors 3 and 4 of the microturbine according to the invention, the arrangement shown in FIG. 2 and described here is advantageously used.

In this arrangement, the LP centrifugal compressor 15, dimensioned accordingly, supplies two LP compressed gas (air) circuits in parallel, downstream of its diffuser 9. The $1^{st}$, as in FIG. 1, supplies (arrows F2) the HP compressor 16 via the outer LP compressed air duct 25, whilst the $2^{nd}$ circuit comprises a duct 60 emerging from the outer casing of the microturbine through the cylindrical wall 24, in an extension of the diffuser 9 which may be substantially radial, and supplies with LP compressed air (arrow F15) a centripetal turbine 61 comprising a distributor 62 with fixed, annular blades surrounding the centripetal turbine wheel 63, whose blades are carried on one face of a rotor 64 in the form of disc. On the opposite face of the rotor disc 64 from the blades of the centripetal turbine 61, a permanent magnet 65 in the form of an annular disc is adhesively bonded or embedded on the rotor 64 and is connected for rotation with the rotor 64 and with the turbine wheel 63, and rotates opposite flat armature windings 66, immobilized in the bottom of a cylindrical recess formed in a support 67 of a thermally insulating material, fixed laterally in cantilevered manner on the shell 52 of the tank 51 and constituting a part of the casing of a turbogenerator 68 thus formed, of which the complementary part of the casing consists of an extension 69 of the annular axial end wall 27 of the microturbine. In this part 69 of the casing of the turbogenerator 68, an annular opening is arranged around a cylindrical central body 70 and constitutes the axial outlet 71 of the centripetal turbine 61, the flow of LP compressed air arriving at this turbine 61 via the duct 60 being guided by the face of the rotor disc 64 on the side of the blades of the turbine wheel 63 and by the opposing casing part 69 towards the axis of rotation of the rotor disc 64, before the expanded air is exhausted after passage into this turbine 61 via the axial annular outlet 71. The electrical currents induced in the windings 66 by rotation of the magnet 65 are collected by an electrical energy storage battery 72 and its associated electronic control and regulating circuits, this battery 72 being supported under the insulating support 67, which thermally insulates the electric generator 65-66 and the turbine 61 of the turbogenerator 68 with regard to the casing 24-31 of the microturbine, surrounding the two rotors 3 and 4, the combustion chambers 19 and 20, together with the compressed air flow ducts LP 25 and HP 26 and the ducts for flow of the gases produced by combustion. Thus, the electric generator 65-66 is the seat of only moderate temperatures and retains its electrical effectiveness. As in the case of the rotors 3 and 4 of the microturbine, the rotor 64 of the turbogenerator 68 is supported axially and radially by gas bearings such as the aerodynamic bearing 73 shown schematically around the central body 70 and similar to the aerodynamic bearings 46 and 47 of FIG. 1.

Furthermore, supply of the centripetal turbine 61 of the turbogenerator 68 with the flow of LP compressed air travelling via the duct 60 from the compressor 15 of the LP stage 1 of the microturbine may be controlled by opening a micro check valve 74, selectively closing off the duct 60.

As a variant, the centripetal turbine 61 may be supplied, from the duct 60, through a volute (not shown) surrounding this centripetal turbine 71, instead of the centripetal annular diffuser 62 with fixed blades.

The battery 72 may be connected by at least one electrical power outlet, shown schematically by the two conductors 75 in FIG. 2, to at least one electrical consumer unit.

One specific consumer unit, supplied by the conductor 76 from the battery 72, consists of the electrical ignition device (s) 50 associated with the main combustion chamber 19, together with the possible similar ignition devices (not shown) associated with the secondary combustion chamber 20.

Another specific consumer unit may be a heating resistor 77, disposed inside the lower chamber 56 of the tank 51, against the bottom of the shell 52, and supplied by the electrical conductor 78 from the battery 72, to produce pressurized steam supplying the LP centripetal turbine 17 of the microturbine, in order to start the latter, thus fitted with an electrical starter with heating resistor.

Advantageously, however, the microturbine is started by means of a pneumatic device, since other components suitable for driving the LP rotor in rotation to start the microturbine, such as an electric motor for example, are too sensitive to a hot environment.

In the embodiment shown in FIG. 2, the pneumatic starting device is a starter 79 in the form of a gas generator by combustion of a solid propellant, a cartridge 80 of which is positioned in a tubular combustion chamber 81 of the starter 79, combustion of the cartridge 80, for example of a "low temperature" propellant, being controlled for each start of the microturbine by an electric or electrically triggered pyrotechnic ignition device 82 accommodated at the base of the combustion chamber 81, the ignition device 82 being supplied via the electrical conductor 83 from the battery 72 and the tubular combustion chamber 81 of the ignition device 79 leading via a convergent path 84 into a volute 85 arranged inside the outer bead 29' surrounding the annular admission air inlet 30 of the LP compressor 15 of the microturbine, such that a gas stream resulting from combustion of the solid propellant is directed via the convergent path 84, the volute 85 and inlets 86 in the radial wall 27 at the axial end of the casing of the microturbine, so as to cause the rotor 3 of the LP stage 1 to rotate. In particular, the inside of the volute 85 is connected to the inside of the outer casing of the microturbine by discrete, quasi-tangential inlets 86, passing through this casing and leading into the channel of the LP compressor wheel 7, so as to communicate a driving torque to the rotor 3 of the LP stage 1.

Until the nominal pressure conditions are reached, the micro check valve or gate 74, which regulates the rate of flow of the LP compressed air stream towards the turbine 61 of the turbogenerator 68, remains closed in order to facilitate start of the microturbine.

As a variant, a cartridge of compressed air may be substituted for the cartridge of solid propellant 80 in a compressed air starter which may be substituted for and preferably interchangeable with the gas generator starter 79.

When it is preferred, for certain applications, to use the useful power available at the LP power turbine 17 in pneumatic form, it will be noted that compressed air is directly available thanks to the flow of LP compressed air conveyed in the duct 60. This duct 60 may then be arranged as a volute externally surrounding the casing 5 of the LP stage 1 for collection of the working compressed air in a duct, of the pipe type, for connection to the point of pneumatic utilization.

FIG. 3 shows a variant of the microturbine of FIG. 1, in which only the HP stage has been modified, such that the other parts and components of the microturbine are labelled in FIG. 3 with the same reference numerals as in FIG. 1, function in the same way and are not described again.

In FIG. 3, the gas compression means and gas expansion means of the HP stage 2' no longer consist respectively of an HP centrifugal compressor such as 16 associated with an annular diffuser such as 10 and of an HP centripetal turbine such as 18 associated with an annular distributor such as 14 in FIG. 1, with a rotor 4 integrally connecting the HP centrifugal compressor wheel 8 and the HP centripetal turbine wheel 12, but of a device known as a wave compressor-expander, or "wave rotor", or alternatively sometimes known as a "pressure exchanger", which comprises a cylindrical rotor rotating about its axis in a coaxial cylindrical casing surrounding the rotor, and having generally four fixed ports or openings in the casing, opposite which there pass channels formed in the rotor and thus alternately opened and closed at their ends when the rotor rotates in its casing, such that air, admitted via an admission air inlet port, is brought into direct contact with hot, compressed gases, admitted via a gas admission inlet port, and that an energy transfer takes place inside the rotor channels by displacement of expansion waves and compression waves respectively in the hot gases and in the air in direct contact in the channels, such that compressed air leaves the channels via a compressed air outlet port, and the expanded gases are exhausted via an outlet port therefor. The wave compressor-expanders or "wave rotors" are known devices, based on the above-cited German and Swiss patents as well as on the US patents cited below, and of which embodiments with air and hot gas inlet and outlet ports arranged in the two radial end faces of the cylindrical rotor are marketed under the registered trademark COMPREX. The wave compressor-expander, also known by the French brand name CODETON, has also been the subject of a presentation in an article entitled "Compresseur-détendeur à ondes (CODETON) pour turbines à gaz et turboréacteurs" [Wave compressor-expander (CODETON) for gas turbines and turboreactors] by Yves RIBAUD & Véronique QUINTILLA, NOUVELLE REVUE D'AERONAUTIQUE ET D'ASTRONAUTIQUE, No. 5, 1998, and developments regarding the structure and application of the wave compressor-expander have been the subject of numerous patents, of which the following examples may be cited: U.S. Pat. No. 3,879,937, U.S. Pat. No. 4,288,203, U.S. Pat. No. 4,971,524, U.S. Pat. No. 5,052,895, U.S. Pat. No. 5,522,217, and U.S. Pat. No. 5,894,719. Wave compressor-expanders are components which have already been proposed for improving the performance of gas turbines and ensuring supercharging of internal combustion engines, in place of a conventional turbocompressor.

Although, in general, the channels or cells in which the transfer of energy between compression and expansion takes place by direct contact between air and hot, compressed gases are substantially axial channels or cells (straight channels parallel to the axis of the rotor or channels which are curved but lead into the two end radial faces of the rotor), it has recently been proposed that the channels or cells extend substantially radially in a rotor having the general shape of a cylindrical wheel, with generally two ports offset relative to one another in the circumferential direction in a wall, in an inner radial position with regard to the rotor, of a stator casing, and generally two ports offset relative to one another in the circumferential direction in a wall, in an outer radial position with regard to the rotor, of the stator casing, such that the substantially radial channels (rectilinear channels or channels curved into a portion of a spiral) are alternately opened and closed at their inner and outer radial ends, opening being performed by bringing them into a position opposite the ports arranged in fixed positions in the inner and outer walls of the stator casing via apertures formed in these walls. These ports, generally numbering four, ensure, as in a turbine engine compression/expansion stage, fluid connection with the remainder of the installation, via an admission air inlet, a compressed air outlet connected to a combustion chamber, an admission inlet for the combusted gases coming from the outlet of the combustion chamber, and an exhaust outlet for the combusted gases once expanded in the substantially radial channels and directed towards an expander, such as a turbine for example. Such a radial "wave rotor" has been the subject in particular of the publication entitled "NUMERICAL SIMULATION OF UNSTEADY-FLOW PROCESSES IN WAVE ROTORS", in the "Proceedings of IMECE04, 2004 ASME International Mechanical Engineering Congress, Nov. 13-19, 2004 Anaheim, Calif. USA" (IMECE2004-60973).

In the variant of FIG. 3, such a radial "wave rotor", of which the rotor 4' and the four ports of the stator casing 6' are illustrated schematically in FIG. 4, is used as HP stage 2' instead of the HP turbocompressor stage 2 of FIG. 1.

In the variant of FIGS. 3 and 4, the LP compressed air, coming via the outer duct 25 from the outlet of the LP centrifugal compressor 15, is admitted via the axial inlet 35', arranged in the thermally insulating radial wall 34' over only part of the periphery of the central body 32 of the thermally conductive end radial wall 31, so as to communicate with the inner radial chamber 87 (see FIG. 4) defined on one side by a wall 88 in the general shape of a rounded Z, of a thermally insulating material and non-rotationally fixed radially inside the annular rotor 4', said chamber 87 opening via a port 89 towards the radial channels 90 passing through the rotor 4' and in which the LP compressed air undergoes recompression by direct contact with the hot, pressurized exhaust gases coming from the outlet of the main combustion chamber 19 and entering the radial channels 90 of the rotor 4' via a port 91 which extends in the casing 6' only over part of the outer radial periphery of the rotor 4', such that the HP compressed air leaves the channels 90 of the rotor 4' via a port 92, bordered in the casing 6' to another part of the outer radial periphery of the rotor 4' and leading into the annular duct 26 for HP compressed air guided towards the inlet of the main combustion chamber 19, and that the hot gases which have entered via the port 91 into the channels 90 of the rotor 4' leave, expanded and cooled, via a port 93 extending over another part of the inner radial periphery of the rotor 4', towards an inner radial chamber 94 on the other side of the Z-shaped wall 88 of the stator casing, whence these expanded hot gases leave via an axial outlet 38', which extends over only part of the periphery of the central conductive body 37, integral with the conductive radial wall 21'e, towards the inlet of the secondary combustion chamber 20, in which these gases are reheated, as described with reference to FIG. 1, so as then to be guided towards the LP centripetal turbine 17 or power turbine, in which these gases expand before escaping towards the surrounding atmosphere.

In FIG. 3, in the casing 6' of the HP stage 2' accommodating the wave rotor 4', in order to limit the extension in the circumferential direction of the outlet port 92 for the HP compressed air leaving the radial channels 90 and of the inlet port 91 for the combusted gases leaving the main combustion chamber 19 and entering the radial channels 90 of the rotor 4', the annular radial flange 36', integral with the axial end of the conductive inner wall 22 at its end facing the wave rotor 4', is integral with the conductive radial wall 21'e, except at the level of the inlet port 91, on the one hand, and, on the other hand, integral with the insulating radial wall 34', except at the level of the outlet port 92. Likewise, to delimit the axial inlet 35' and outlet 38' openings, respectively to the chamber 87 and from the chamber 93 defined by the Z-shaped inner radial partition 88 fixed inside the rotor 4', the insulating radial wall 34' is in contact with the periphery of the central body 32 except at the level of the axial inlet 35', and the conductive radial wall 21'e is in contact with the conductive central body 37 over the periphery of the latter except at the level of the axial outlet 38'.

Of course, in this configuration the wave rotor 4' integrated into the high pressure stage 2' brings the advantages specific thereto, in particular of structural simplicity and effectiveness.

The invention claimed is:

1. Thermal engine comprising:
    two independent rotors (3,4,4'), each respectively mounted in one of two casings (5,6,6'), the first rotor (3) belonging to a low pressure stage (1), the second rotor (4,4') belonging to a high pressure stage (2,2'), each stage (1,2,2') provided with its rotor (3,4,4') and associated fixed fluid preparation members (9,10,13,14,89,91,92, 93) combining gas compression means, known as compressors (15,16,90), and gas expansion means, known as expanders (17,18,90); and
    at least one combustion chamber (19,20) situated within a substantially cylindrical central volume defined
    at its bases by the two rotors (3, 4, 4') and their casings (5, 6, 6'), and
    at its lateral surface by a first substantially cylindrical wall (22), in an inner radial positions;
    said first wall being substantially coaxial with a second substantially cylindrical wall (23) in an intermediate radial position, these defining between them a first duct (26) connecting the outlet of the compressor (16,90) of the high pressure stage to the inlet of a first combustion chamber (19);
    and said second wall (23) being substantially coaxial with a third substantially cylindrical wall (24) in an outer radial position, these defining between them a second duct (25), outside the first duct (26) and connecting the outlet of the compressor (15) of the low pressure stage (1) to the inlet of the compressor (16, 90) of the high pressure stage (2, 2');
    the outlet of the first combustion chamber (19) supplying the expander (18,90) of the high pressure stage (2,2') with gases produced by combustion, guided from the outlet of the expander (18,90) of the high pressure stage (2,2') to the inlet of the expander (17) of the low pressure stage (1), the outlet of which is in communication with the outside of a casing (24,27,31) of the engine via at least one exhaust opening (41) for the gases produced by combustion.

2. Thermal engine according to claim 1, in which the casing (24, 27, 31) of the engine, which comprises the third wall (24) defining radially towards the outside the second, annular, outer duct (25) for the flow of low pressure compressed gas, is made of thermally conductive material.

3. Thermal engine according to claim 1, in which the first, annular, inner duct (26) for the flow of high pressure compressed gas, is defined between the second wall (23), arranged as an intermediate casing of a thermally insulating material, radially towards the outside and separating it from the second duct (25), and the first wall (22) arranged as an inner casing of a thermally conductive material, radially towards the inside and separating it from the first combustion chamber (19).

4. Thermal engine according to claim 1, in which exhaust towards the outside of the gases stemming from the expander (17) of the low pressure stage (1) is ensured by discrete ducts (41) extending substantially radially towards the outside relative to the axis (XX) of the first rotor (3).

5. Thermal engine according to claim 1, comprising two combustion chambers (19,20) accommodated in the central volume between the two rotors (3,4), of which the first combustion chamber, known as the main combustion chamber (19), supplied with high pressure compressed gas, exiting from the compressor (16) of the high pressure stage (2) via the first duct (26), converges substantially in the direction of the axis (XX) of the second rotor (4) towards the inlet of the expander (18) of the high pressure stage (2), whose outlet (38) leads into the inlet of the second combustion chamber, known as the secondary combustion chamber (20), surrounded by the first annular combustion chamber (19) and which converges axially towards its outlet connected radially towards the outside to the inlet of the expander (17) of the low pressure stage (1), flow of the gases in the two combustion chambers (19,20) taking place substantially axially in opposing directions.

6. Thermal engine according to claim 5, such that the two combustion chambers (19, 20) are separated from one another by a substantially conical central partition (21) of a thermally conductive material shaped so as to define the countercurrent convergent paths of the two combustion chambers (19, 20).

7. Thermal engine according to claim 4, in which ducts (41) exhausting towards the outside the exhaust gases stemming from the expander (17) of the low pressure stage (1) are defined between two substantially radial, thermally insulating inner walls (39,42), one (39) of which surrounds the outlet (40) of the expander (17) of the low pressure stage (1), while the second (42) diverts radially towards the outside the gases produced by combustion stemming from said at least one combustion chamber (19,20) and from the expander (18) of the high pressure stage (2).

8. Thermal engine according to claim 1, for which the ratio of the substantially radial and axial dimensions relative to the axis (XX) of one at least of the rotors (3,4) is about 1.

9. Thermal engine according to claim 1, the low pressure stage (1) of which comprises the first rotor (3), which comprises, on a face facing the outside of the engine, a bladed wheel (7) of a centrifugal compressor (15), which rotates radially inside an annular diffuser (9) with blades which are fixed relative to the casing (5) of the first rotor (3), and, on the inner face of the first rotor, a bladed wheel (11) of a centripetal turbine (17), which rotates radially inside an annular centripetal distributor (13) with blades which are fixed relative to the casing (5) of the first rotor (3), the wheels (7,11) of the compressor (15) and turbine (17) being connected for rotation around their common axis (XX), which is the axis of the first rotor (3).

10. Thermal engine according to claim 9, the high pressure stage (2) of which has an architecture similar to that of the low pressure stage (1), the two stages being inverted relative to one another, the high pressure stage (2) comprising the second rotor (4), which comprises, on a face facing the outside of the engine, a bladed wheel (8) of a centrifugal compressor (16), which rotates radially inside an annular diffuser (10) with blades fixed relative to the casing (6) of the second rotor (4), and, on the inner face of the second rotor (4), a bladed wheel (12) of a centripetal turbine (18), which rotates radially inside an annular centripetal distributor (14) with blades fixed relative to the casing (6) of the second rotor (4), the wheels (8,12) of the compressor (16) and the turbine (18) being connected for rotation around their common axis (XX), which is the axis of the second rotor (4).

11. Thermal engine according to claim 9, the high pressure stage (2') of which comprises a wave compressor-expander, known as a "wave rotor", in which a transfer of energy between compression of a gas and expansion of combusted gases takes place inside a wheel (4') with channels (90) by direct contact between said gas and said combusted gases in said channels (90) and by a process based on the displacement of expansion waves and compression waves in said channels (90) of said channeled wheel (4'), said "wave rotor" comprising an inlet (89) for admission gas (air), an outlet (92) for compressed gas (air), connected to a first combustion chamber (19), an admission inlet (91) for the combusted gases stemming from the outlet of the first combustion chamber (19), and an exhaust outlet (92) for said combusted gases, towards a second combustion chamber (20), if applicable, and the expander (17) of the low pressure stage (1).

12. Thermal engine according to claim 1, of which the rotors (3, 4) are supported axially and radially by gas bearings (44, 45, 46, 47).

13. Thermal engine according to claim 1, in which the casing (24, 27, 31) of the engine defining, radially towards the outside, the second duct (25) is at least partially immersed in a preferably double-walled (52), impermeable, closed water tank (51), intended to produce pressurized steam and to insulate the thermal engine thermally from the outside and facilitate its integration in a receptacle designed therefor.

14. Thermal engine according to claim 13, in which the steam produced in a first chamber (56) of the tank (51) has its pressure controlled by a valve (58) communicating with a second tank chamber (54), itself in communication with the inlet of the expander (17) of the low pressure stage (1), so as to mix steam with the gases produced by combustion stemming from said at least one combustion chamber (19,20), before passage thereof into the expander (17) of the low pressure stage (1).

15. Thermal engine according to claim 14, in which the gases and steam stemming from the expander (17) of the low pressure stage (1) are exhausted via separate ducts (41), and continuing (55) through the water tank (51) before emerging into the surrounding environment, so as to ensure preheating of the water in the tank (51).

16. Thermal engine according to claim 13, in which the stream of gas (air) stemming from the compressor (15) of the low pressure stage (1) is divided into two flows, one of which is directed towards the compressor (16) of the high pressure stage (2) and the other towards utilization (60), in pneumatic form, of the useful power.

17. Thermal engine according to claim 16, in which the flow of low pressure compressed gas (air), corresponding to the useful power transmitted by the compressor (15) of the low pressure stage (1), supplies a turbine (61) of a turbogenerator (68), whose electric generator (65, 66) supplies a battery (72), connected by at least one electrical power outlet (75) to at least one electrical consumer unit.

18. Thermal engine according to claim 17, in which the electric turbogenerator (68) is thermally insulated (67) from the engine casing enclosing the two rotors (3,4), said at least one combustion chamber (19,20) and the ducts (25,26) for the flow of low pressure and high pressure compressed gas (air) and low pressure and high pressure gases produced by combustion.

19. Thermal engine according to claim 18, in which the electric generator (65,66) of the turbogenerator (68) is of magnetic type, comprising at least one permanent magnet (65) mounted on one face of a bladed wheel (63) of the centripetal turbine (61) of the turbogenerator (68), on the opposite side to the face having the blades of said centripetal turbine (61), said at least one permanent magnet (65) being connected for rotation to the centripetal turbine wheel (63) of the turbogenerator (68) and revolving opposite at least one flat armature coil (66) of the electric generator (65,66).

20. Thermal engine according to claim 19, in which the battery (72) supplied by the electric generator (65,66) of the turbogenerator (68) itself supplies at least one electrical ignition device for the gas (air)/fuel mixture in said at least one combustion chamber (19, 20), into which fuel is injected via at least one fuel supply duct (49, 49').

21. Thermal engine according to claim 17, in which the battery (72) supplied by the electric generator (65,66) of the turbogenerator (68) itself supplies at least one heating resistor (77) disposed in a chamber (56) of the water tank (51), to produce pressurized steam supplying the expander (17) of the low pressure stage (1) so as to start the thermal engine with electrical starter with heating resistor (77).

22. Thermal engine according to claim 17, in which the flow of low pressure compressed gas (air) stemming from the compressor (15) of the low pressure stage (1) supplies the centripetal turbine (61) of the turbogenerator (68) after opening of a check valve (74), through an element selected from an annular centripetal distributor (62) with fixed blades surrounding the bladed wheel (63) of said centripetal turbine (61) of the turbogenerator (68), and a volute surrounding said centripetal turbine (61) of the turbogenerator (68).

23. Thermal engine according to claim 1, equipped with a starter (79) using solid propellant (80), in which the starter (79) is arranged as a gas generator by ignition (82), of the solid propellant (80), such that a gas flow resulting from combustion of the solid propellant is directed, via at least one inlet (86) in a radial end face of the engine casing, preferably around an admission gas (air) inlet opening (30) in the thermal engine, so as to bring about rotation of the rotor (3) of the low pressure stage (1).

24. Thermal engine according to claim 23, in which the starter (79) arranged as a gas generator receives a solid propellant cartridge (80) provided for each start of the thermal engine, said gas generator being connected to the inside of the casing of the thermal engine via at least one quasi-tangential inlet (86) so as to set the rotor (3) of the low pressure stage (1) in rotation.

* * * * *